United States Patent [19]

Wilson

[11] Patent Number: 4,597,521

[45] Date of Patent: Jul. 1, 1986

[54] ROTARY NOTCHER FOR A JOINED METALLIC STRIP

[75] Inventor: Richard F. Wilson, Youngstown, Ohio

[73] Assignee: Wean United, Inc., Pittsburgh, Pa.

[21] Appl. No.: 703,580

[22] Filed: Feb. 20, 1985

[51] Int. Cl.[4] .......................... B26D 1/62; B23K 31/10

[52] U.S. Cl. ....................................... 228/160; 83/295; 83/303; 83/333; 83/345

[58] Field of Search ................................ 228/159-163, 228/170, 171; 83/303, 295, 298, 345, 333, 692, 671

[56] References Cited

U.S. PATENT DOCUMENTS

| | | | |
|---|---|---|---|
| 3,570,356 | 3/1971 | Bodenhein | 228/161 X |
| 4,072,076 | 2/1978 | Miles | 83/345 X |
| 4,442,742 | 4/1984 | Orlow | 83/303 |
| 4,450,740 | 5/1984 | Chapman, Jr. et al. | 83/303 |

*Primary Examiner*—Kuang Y. Lin
*Attorney, Agent, or Firm*—Daniel Patch

[57] ABSTRACT

A rotary notcher is used in a continuous strip processing line for metallic strip to cut out side or edge portions of the joined strips in the welded area. When an arc welder is used, welding may be done only in the center area of the seam remote from where the notching occurs. The rotary notcher is activated in a time relationship with the welding process to notch along the joined seam. The notcher comprises two opposed housings along longitudinal edges of the strip for cantileverly supporting a cooperative pair of rotatable knife drums each having cooperative arcuate surfaces upon which an arcuate knife is mounted, and cooperative flat sections for allowing the strip to travel therebetween without hitting against the drums. The knife has a continuous gradual slope with a desired depth formed between the two extremes of the edge of the knife to effect a smooth continuous cut.

11 Claims, 3 Drawing Figures

ROTARY NOTCHER FOR A JOINED METALLIC STRIP

BACKGROUND OF THE INVENTION

The present invention relates to a notcher and a method of its use in a continuous processing line, pickling line, or a cold rolling mill for rolling metallic strip. More particularly, it concerns a rotary notcher for cutting a portion along opposed longitudinal edges of a strip in a smooth, continuous fashion in the vicinity of a welded seam between two joined strips.

Notching two joined strips along its welded seam while travelling through a continuous processing line is common practice, and is performed to smooth out the edges of the welded area in order to eliminate or decrease the possibility of rough spots from snagging and damaging the equipment through which the strip subsequently passes and also to eliminate projecting corners where required to welded strip of different widths.

Conventional apparatuses for forming a notch inward along the longitudinal edges of a welded seam between two joined horizontal strips employ what is commonly referred to as a "wing" notcher, the "wing" notcher consists of two edge notching units each located transversely across from each other between which the strip passes. Each notching unit is positioned remotely away from the strip as the strip travels through the line, and for the notching operation the strip is completely stopped and the notching units are brought towards each other to the longitudinal edges of the strip. Each notching unit has a cylinder operated head carrying a die punching mechanism which punches cut a predetermined configuration along the seam weld.

For its operation, the notching units of these conventional apparatuses are moved in toward the edges of the strip. The strip, upon leaving the welder, is stopped when the welded seam of the joined strip runs parallel to the two notching units. The die carrying head is moved vertically toward the horizontal surface of the strip for the notching process; after which time, each unit is then moved away from the strip in preparation for the strip's continued travel through the line. It will be appreciated that the requirement for stopping the strip results in considerable downtime and production loss of the line.

It is therefore an object of the present invention to provide an apparatus and a method of operation for cutting out an area along a longitudinal edge of a moving product without interrupting its travel making a notch in the product on the fly which results in increased production in the line.

It is a further object of the present invention to provide an apparatus in a continuous metallic strip processing line located downstream from a welding apparatus for decreasing the total welding time for two strips and the notching time necessary for present day notching apparatuses, thereby requiring a less extensive accumulator storage facility especially when using an arc welder.

More particularly, it is an object of the present invention to provide a rotary strip notcher in a continuous strip processing line for allowing the strip to accelerate in the line after the welding of two joined strips, and upon the welded seam performed by an arc welder and approaching the rotary notcher, cutting out a smooth continuous curve along the longitudinal edges of the seam which had not been previously welded together.

And still a further object of the present invention is to provide an apparatus for shearing and removing a predetermined portion along at least one longitudinal edge of a travelling metallic material, comprising drum means located along said one longitudinal edge and comprising at least two spaced-apart cooperative and rotatable drums, each having an axis of rotation and between which said edge of said material passes, means for cantileverly mounting said drums transversely relative to said material in a manner their axis is in alignment relative to each other in a vertical plane and for retaining said drums in a shearing and non-shearing relationship with said material, said drums having cooperative arcuate surface areas and cooperative flat surface areas, arcuate knife means mounted on said arcuate surfaces of said drums constructed and arranged in a manner to give a predetermined edge cut having a slope between the beginning and end of the edge cut that will be a continuous radius and of a desired length and depth, and means for synchronously rotating said drum means in relation to said travelling material, including means for controlling the rotation of said drum means constructed in a manner so that in said inoperative mode said flat surface areas of said two drums oppose and are fixedly held adjacent each other so as not to be contacted by said travelling material, and in an operative mode said two drums commence to rotate in opposite directions but in the same direction of the travel of the material to bring said arcuate knife means on said each drum together in a cooperative contacting relationship with said material to effect said shearing and removing of said predetermined portion in said material.

These and other objects and advantages of the present invention will be better appreciated and understood when the following description of a preferred embodiment thereof is read along with the accompanying drawings of which:

DETAILED DESCRIPTION OF THE DRAWINGS

The notcher of the present invention has particular application in a continuous strip processing line such as an electrolytic galvanizing line or a rolling mill for rolling cold metallic strip, such as steel or aluminum ranging in thickness from 0.060 inch to 0.250 inch, in which the strip generally travels in a flat horizontal positioning.

The rotary notcher of the present day type as well as that of the present invention is located immediately downstream from a welder and upstream from an accumulator or storage pit and is operated in a time relationship with the welder after two strips, either of the same width or of varying widths are welded together. The welder may be one of several well-known types, such as a flash butt welder or a shear arc welder.

Figure 1:
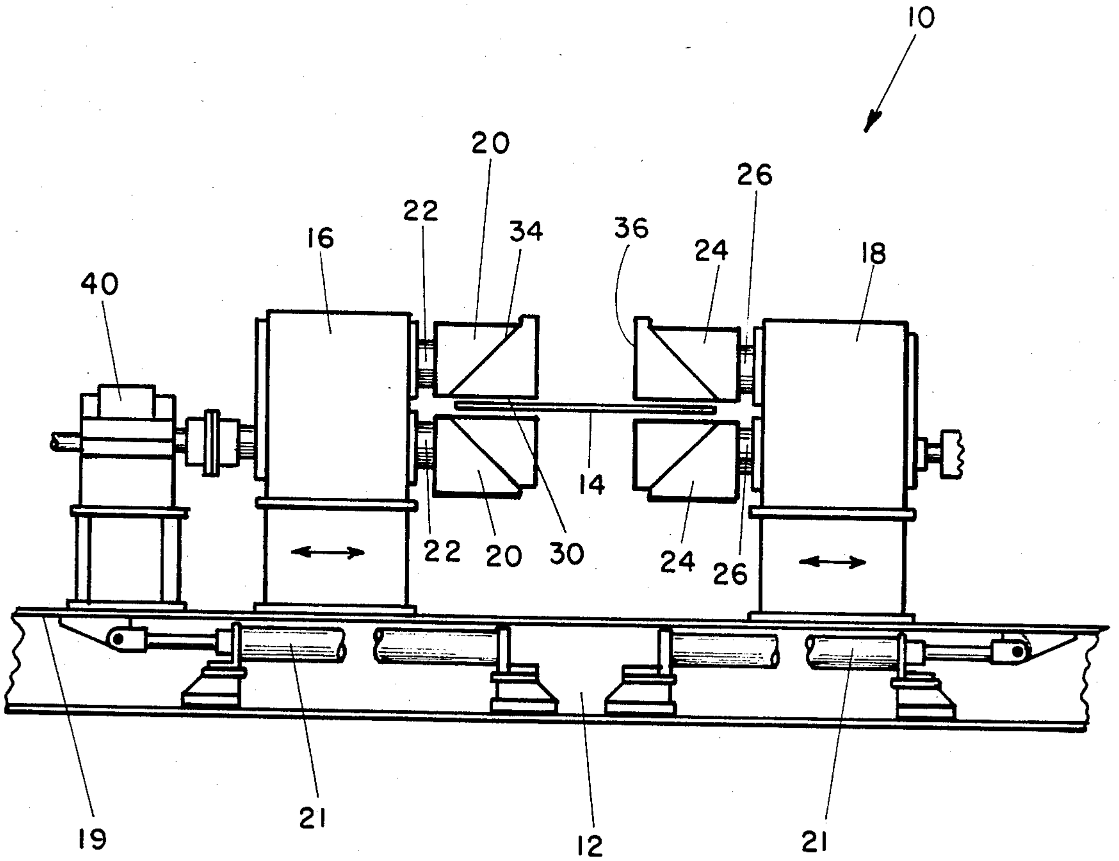
FIG. 1 is an elevational view of the present invention.

Referring first to FIG. 1, notcher assembly 10 is mounted on a foundation 12 along the live or mill floor transversely to the longitudinal dimension of strip 14. It comprises two opposed housings 16 and 18 which are mounted on the foundation 12 in tracks 19 upon which they are motivated by hydraulic cylinders 21 to the left and right of FIG. 1 as indicated by the double arrow on each housing 16 and 18.

Two spaced-apart upper and lower drum heads 20 are cantileverly and rotatably mounted by stub shafts 22 in housing 16, and likewise, two spaced-apart drum heads 24 are cantileverly and rotatably mounted on stub shafts 26 in housing 18.

As shown to the left and right of FIG. 1, each cooperative pair of heads 20, 24 are positioned relative to each other so as to allow strip 14 in a flat horizontal position to pass therebetween.

Figure 2:
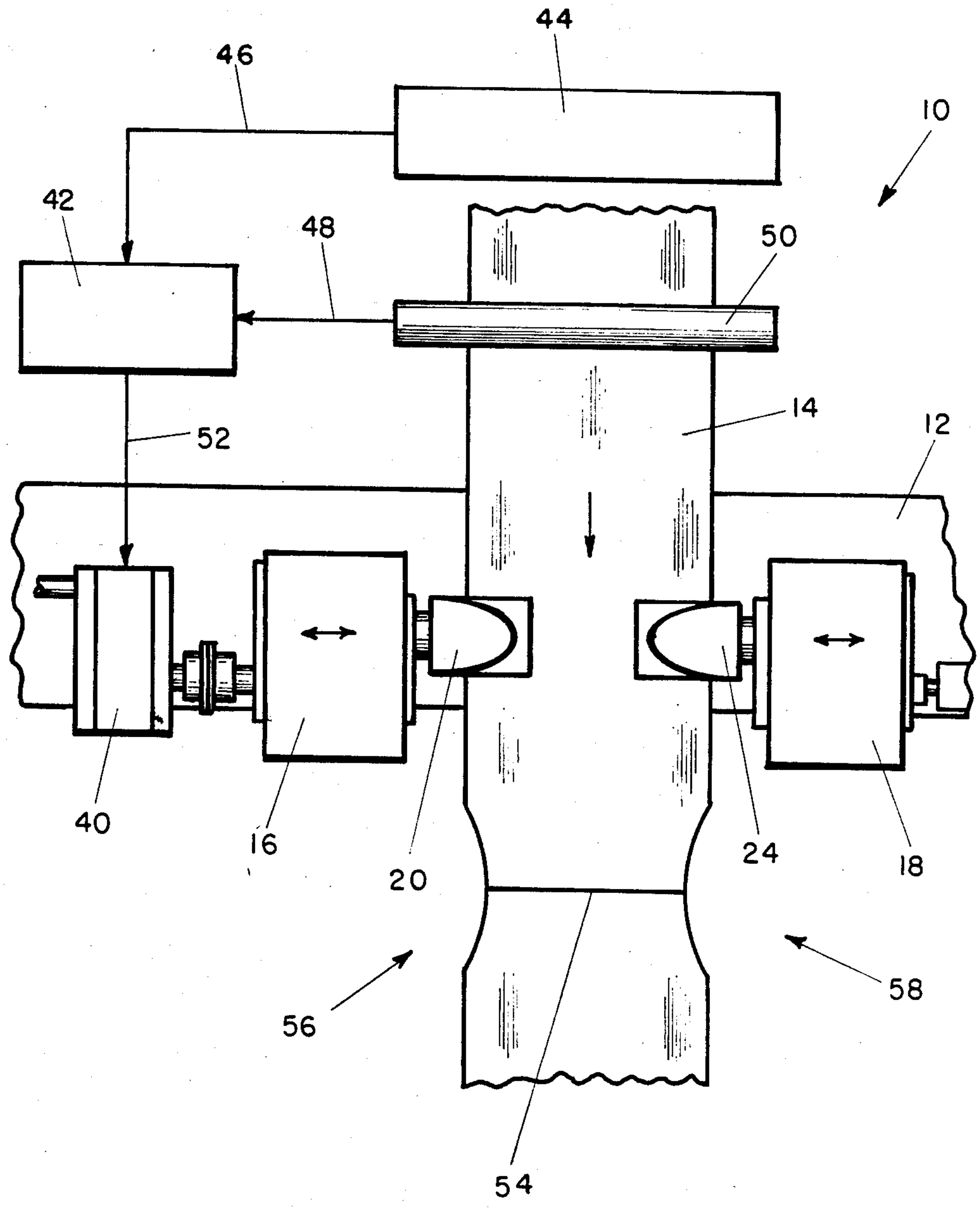
FIG. 2 is a plan view of the present invention.
Figure 3:
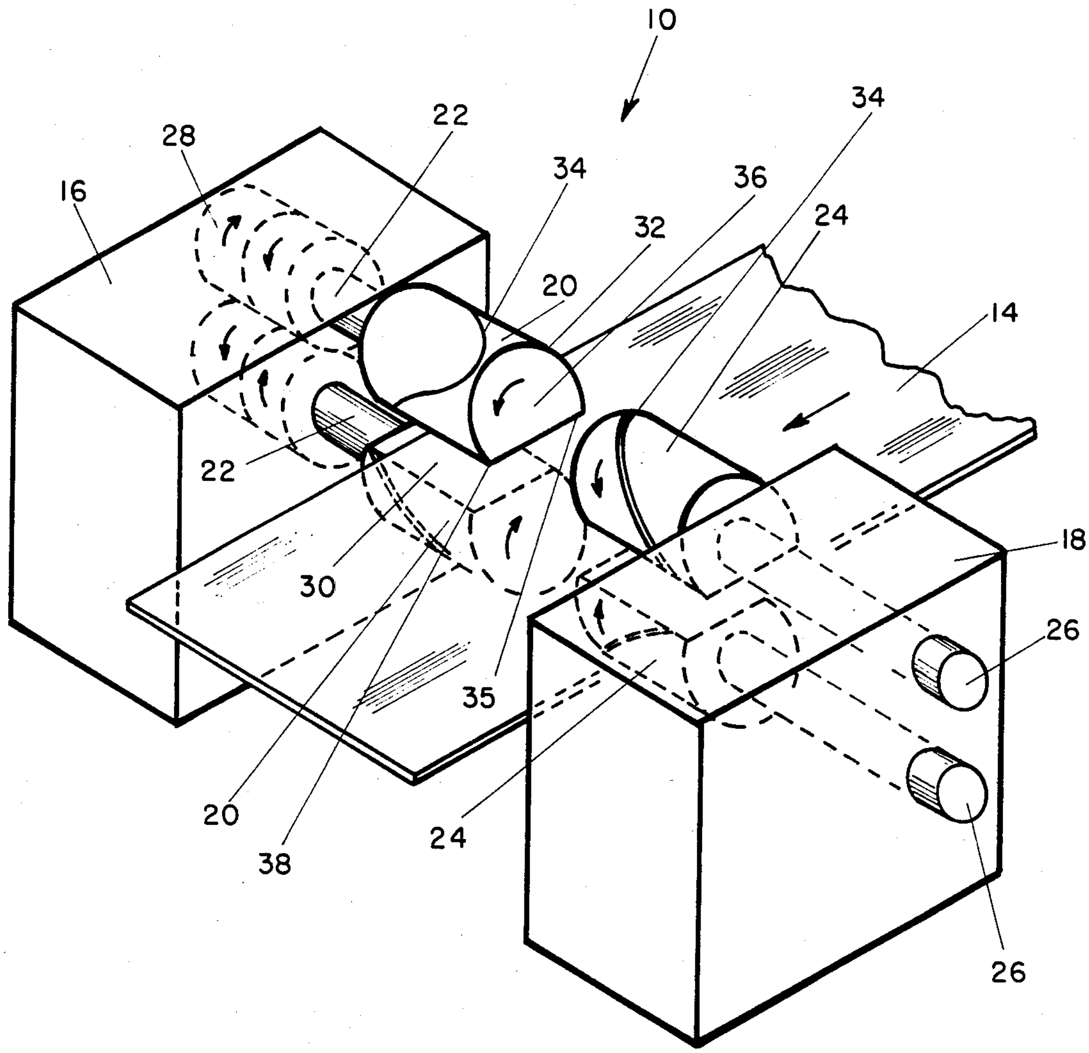
FIG. 3 is an isometric view of the present invention.

FIGS. 2 and 3 show. by an arrow on strip 14 the direction in which strip 14 travels, and as shown in FIGS. 1 through 3, each cooperative pair of heads 20, 24 are positioned transversely across the width of strip 14 and are associated with opposed longitudinal edges thereof.

As FIG. 3 shows, heads 20 of a cooperative pair are driven by a meshing gearing arrangement 28, as are heads 24, more of which will be discussed shortly.

Each drum head 20, 24 is substantially cylindrical and as particularly shown in FIG. 3, has a flat surface area 30 and an arcuate surface area 32, the latter upon which, an arcuate blade or knife 34 is mounted for cooperating with its mated drum to effect a notch cut therealong. FIGS. 1 through 3 show the radius of arcuate knife 34 and the curved configuration of the notched area along the longitudinal edges of the strip is shown only in FIG. 3.

The radius of arcuate blade 34 is a continuous smooth slope extending from one peripheral edge 35 of an inward face 36 of the cylindrical or arcuate surface 32 of each head 20, 24 approximately 270 degrees to another peripheral edge 38 along the same inward face 36 of drum heads 20, 24, which face 36 of each head is positioned toward the center line of strip 14. It will be appreciated that the length and shape of the cut-out portion can be varied to suit a number of different desired conditions by altering the length and curve of the knives.

Cooperative heads 20, 24 of each cooperative pair are mounted for rotation and are synchronously driven through anti-back lash gearing arrangement 28 by a direct current motor assembly 40.

In an inoperative mode for the rotary notcher 10 of the present invention, heads 20 and 24 are all rotated to position flat surfaces 30 of each drum immediately adjacent the upper and lower flat surfaces of strip 14. In this mode strip 14 is held away from drum heads 20, 24 by control 42 to allow strip 14 to freely travel therebetween without hitting against heads 20 and 24.

For an operative mode of the rotary notcher of the present invention, the weld finished signal from welder 44 is fed along line 46 to control 42 along with the speed of strip 14 through line 48, which speed is monitored by a pair of pinch rolls one of which is shown at 50 in FIG. 2. The operation of d.c. motor assembly 40 is controlled through line 52, and the as welded seam (FIG. 2) of strip 14 approaches rotary notcher assembly 10, each head 20, 24 of a cooperative pair is rotated in synchronism with the speed of the travelling strip 14 in a direction opposite its mating drum head to bring its arcuate surface 32 into position adjacent the strip surface causing its arcuate knife 34 to contact the upper and lower surfaces of strip 14.

Upon this rotation a point cutting action commences from one extreme edge 53 inwardly toward the center line of strip in an area along the welded seam 54 (FIG. 2) where the joined strips may not be welded up to the welded area and back again to an opposed extreme edge 55 of the strip away from the point where the cutting action started. A smooth continuous and extended curve is made in the strip 14 as shown at 56 and 58 in FIG. 2 with no sharp or rough edges existing around the vicinity of the welded seam and the length of the knife cut 56, 58 from edge 53 to edge 55 would be approximately at a maximum of 12 inches. It is to be noted that both curves 56, 58 shown in FIG. 2 are performed simultaneously through a signal from pinch roll 50, since the portion of notcher assembly 10 to the extreme right of FIG. 2 contains a control unit 42 and is electrically connected to the elements as schematically shown with regard to the portion of notcher assembly 10 shown to the extreme left of FIG. 2.

Since a notched portion of strip 14 is removed, it is not necessary to weld across the full width of strip along the juncture of the two strips especially when an arc welder is used. Therefore, in the welding process the operator can control through suitable means welder 44 to an extent to minimize the welding time by skipping over the portions to be notched out and to weld only the central area of the strip where the notching is not performed. After the welding process, the pinch rolls 50 are driven to start the strip's acceleration through the line at which point the present invention comes into play as discussed above.

The depth of the inward cut 56, 58 toward the center line of the strip is determined by the transverse positioning of heads 20 and 24 on foundation 12 according to the width of the strip 14, and this positioning can be preset with reference to the width of a strip or strips as they are uncoiled into the line or mill. Since the peripheral speed of the knives will always be synchronized with the strip, one has the option to use the full length and hence depth of the knives or only a part thereof in which case only the inward portion as viewed in FIG. 2 will be used. If two different width strips are joined, the adjustment of heads depend on the maximum width strip, and this positioning of heads 20 and 24 relative to the strip is such as to always effect a smooth continuous curved cut along the welded seam or up to the weld section of the seam made by a shear arc welder with no rough edges as that shown in FIG. 2. The width difference for joined strip 14 will range from 0 inches to 22 inches for optimum efficiency of the present invention.

In accordance with the provisions of the patent statutes, I have explained and described the principle and operation of my invention and have illustrated and described what I consider to represent the best embodiment thereof.

I claim:

1. An apparatus for shearing and removing a predetermined portion of material along at its one longitudinal edge upon its path of travel, comprising:
   - drum means comprising at least two spaced-apart cooperative and rotatable drums, each having an axis of rotation and each located opposite said one longitudinal edge of said material,
   - means for mounting said drums transversely relative to said material in a manner their axis is in alignment relative to each other in a vertical plane and for retaining said drums in a shearing and non-shearing relationship with said material,
   - said drums having cooperative arcuate surface areas and cooperative flat surface areas, arcuate knife means mounted around said arcuate surface area of said drum forming a continuous predetermined radius and extending across said arcuate surface which begins and ends at opposite locations relative to said flat surface area thereof to give a predetermined edge cut having a slope between the beginning and end of the edge cut that will be a continuous radius and of a desired length and depth, and means for synchronously rotating said drum means in relation to the speed of said material, including means for controlling the rotation of said drum means constructed in a manner so that in said inoperative mode said flat surface areas of said two drums oppose and are fixedly held adjacent each other so as not to be contacted by said travelling material, and in an operative mode said two drums commence to rotate in opposite directions but in the same direction of the travel of the material to bring said arcuate knife means on said each drum together in a cooperative contacting relationship with said material to effect said shearing and removing of said predetermined portion in said material.

2. An apparatus according to claim 1, wherein said material has an opposed longitudinal edge transversely spaced from said at least one longitudinal edge, and wherein said drum means further comprises at least two spaced apart cooperative and rotatable drums, each having an axis of rotation and each located opposite sides of said opposed longitudinal edge of said material and located opposite said drum means associated with said one longitudinal edge, and further constructed and arranged relative to said material to perform a said predetermined cut edge along said opposed longitudinal edge upon an operative mode thereof.

3. An apparatus according to claim 2, wherein said means for controlling said drum means further includes means for effecting said operative mode for said drum means associated with said opposed longitudinal edge in a time relationship with said operative mode for said drum means associated with said at least one longitudinal edge.

4. An apparatus according to claim 1 or 3, wherein said two cooperative drums are cantileverly mounted and further comprising:

means for adjusting said drum means transversely relative to said edges of said material to vary said desired depth of said predetermined edge cut.

5. In an arrangement for an apparatus according to claim 1 or 3, wherein said metallic material are two strips transversely joined together by a welder in a continuous processing line, and having a welded seam area, wherein said drum means are located downstream from said welder, and wherein said controlling means for said drum means controls said commencement of said rotation of their said respective cooperative drums as said welded seam area of said joined strip starts its said passage between said each two pairs of cooperative drums of said drum means.

6. In an arrangement according to claim 5, wherein said welder is an arc welder and further comprising:

means for controlling said welding process of said joined strip constructed in a manner so that said welding only occurs in an area located away and inwardly along a seam of said joined strips where said predetermined edge cuts on said opposite edges of said strip are to be effected.

7. A method for shearing and removing a predetermined portion along at least one longitudinal edge of a travelling metallic material, the steps comprising:

locating drum means along said longitudinal edge which drum means has at least two spaced-apart cooperative and rotatable drums between which said edge of said material passes and having an axis of rotation, mounting said drums which have cooperative arcuate surface areas and cooperative flat surface areas on said drums, transversely relative to said material in a manner their axis of rotation is in alignment relative to each other in a vertical plane and retaining said drums in a shearing and non-shearing relationship with said material, mounting arcuate knife means on said arcuate surfaces of said drums such as to produce a predetermined edge cut having a slope between the beginning and end of the edge cut that will be a continuous radius and of a desired length and depth, and synchronously rotating the drums in relation to the travelling material, including controlling the rotation of the drums such that in a non-shearing mode, the flat surface areas of the two cooperative drums oppose and are fixedly held in position adjacent each other so as not to be contacted by the material, and in a shearing mode, causing the two drums to commence rotating in opposite directions but in the same direction as the travel of the material to bring the arcuate knive means on the drums together in a cooperative contacting relationship with the material to effect shearing and removing of the predetermined portion of the travelling material.

8. A method according to claim 7, wherein drum means are located along a longitudinal edge transversely across from said one longitudinal edge, the steps further comprising:

controlling said drum means so as to effect its predetermined cutting action at approximately the same time along the edge of the travelling material across from and on opposite sides thereof.

9. A method according to claim 8, wherein said each pair of cooperative drums of said drum means are cantileverly mounted, and the steps further comprising:

adjusting said drum means transversely relative to the width of said material in accordance with the desired depth of the predetermined edge cut.

10. In a method according to claim 8, wherein in order to form the travelling material, the steps further comprising:

joining two strips together across their widths by a welder in a continuous processing line to produce a welded seam area, locating the drum means downstream from the welder, and as the welded seam area of the joined strip begins its passage between the two cooperative drums of each pair of drums, effecting said commencement of the rotation of each pair of drums to effect said predetermined cut along the welded seam area.

11. In a method according to claim 10, wherein said welder is an arc welder and the steps further comprising:

stationarily holding the two ends of the strips to be joined adjacent to each other in the arc welder, controlling the welding process so as to weld only along an area centrally located along the seam line, commencing the travel of the joined strip in the processing line, and as said welded seam area approaches each pair of cooperative drums, starting the rotation of the drums so that said each predetermined edge cut is effected approximately up to where the welded area exists along the seam line across the width of the joined strips.

* * * * *